United States Patent [19]

Bruijn et al.

[11] 3,846,520

[45] Nov. 5, 1974

[54] SINTERING OF SOL-GEL MATERIAL

[75] Inventors: Engelbertus Jacobus Bruijn, Den Helder; Fokko Wessel Hamburg, Petten; Johannes Bastiaan Willem Kanij, Zvenaar; Robert de Rooy, Egmond, all of Netherlands

[73] Assignee: Reactor Centrum Nederland, The Hague, Netherlands

[22] Filed: May 17, 1972

[21] Appl. No.: 254,038

[30] Foreign Application Priority Data

May 17, 1971 Netherlands.................. 7106712

[52] U.S. Cl....... 264/.5, 252/301.1 R, 252/301.1 S, 423/256, 423/261
[51] Int. Cl............................................. G21c 21/00
[58] Field of Search............... 252/301.1 S, 301.1 R; 423/261, 256; 264/.5

[56] References Cited
UNITED STATES PATENTS

| | | | |
|---|---|---|---|
| 3,342,562 | 9/1967 | St. Pierre | 423/261 |
| 3,344,081 | 9/1967 | Elyard et al. | 252/301.1 R |
| 3,453,216 | 7/1969 | Fitch et al. | 252/301.1 S |

*Primary Examiner*—Stephen J. Lechert, Jr.
*Attorney, Agent, or Firm*—Cushman, Darby & Cushman

[57] ABSTRACT

The invention relates to an economic method for sintering spherical sol-gel material. Spherical hexavalent oxidic uranium material, such as A.D.U. or $UO_3$-hydrate, is converted into nuclear fuel of high density by means of a sinter stage, which consists in heating-up and cooling at a rate of 10° – 65° C/min. The sinter stage may be preceded by a preheating stage. Whereas the starting material may contain finely divided carbon.

Previously only spherical sol-gel material of tetravalent uranium and pressed compacts of ceramic uranium dioxide powder where sintered with the above heating rates. Tetravalent uranium material has disadvantages with respect to hexavalent uranium material.

12 Claims, No Drawings

SINTERING OF SOL-GEL MATERIAL

The invention relates to the sintering of fissile material and more particularly of spherical, uranium-containing particles which have been prepared according to a so-called sol-gel process. As a rule this sol-gel material is composed of a solid substance termed A.D.U. consisting of $UD_3 \cdot xNH_3 \cdot (2-x)H_2O$. A.D.U. and similar materials are prepared in globular form by effecting the solidification of a metalliferous aqueous phase, this being achieved by the action of one or more of the influential factors heat, dehydration, hydrolysis by the action of free ammonia or of ammonia formed by the decomposition of an ammonia donor.

For the metalliferous aqueous phase, use is made of metal hydroxide sols, metal salt solutions, anion-deficient metal salt solutions or mixtures of these liquids, mixed with carbon if so desired.

In many cases solutions of uranyl nitrate or anion-deficient uranyl nitrate are employed as initial material for the preparation of spherical nuclear fissile particles.

Examples of methods of preparation for sol-gel material are disclosed, inter alia, in the Dutch Patent Applications Nos. 65-05885, 69-00701 and 69-18435 and the British Patent Specification No. 1,191,047 in the name of Reactor Centrum Nederland (Stichting).

In order to convert sol-gel material and other ceramic fissile material into nuclear fissile material, it was formerly supposed that a complicated and lengthy sintering process was necessary for this purpose.

Prior-art sintering methods are indicated below:

Preparation of $UO_2$, $PuO_2$ and $ThO_2$ shaped parts, starting with powders from which these compounds are formed:

| Presintering | 20° – 700°C | 100°C/hour | dry $H_2$ |
| Sintering | 700° – 1700°C | 100°C/hour | dry $H_2$ |
| Time required | 1700°C | 1 hour | wet $H_2$ |
| Cooling | 1700°C – 20°C | 200°C/hour | dry $H_2$ |

Total time required for this process, including the calculated time for changing the gaseous atmosphere, approximately 33 hours.

Preparation of $UO_2/ZrO_2$ globules, starting with sol-gel material:

| Heating in steam | 20 – 300°C | 50°C/hour |
| Heating in $CO_2$ | 300 – 900°C | 50°C/hour |
| Heating in $H_2$ | 900 – 1150°C | 50°C/hour |

Total time required including cooling and changing of gaseous atmosphere: about 36 hours.

The uranium-zirconium starting material was prepared by atomizing a solution of uranyl nitrate which had been mixed with zirconium oxide hydrate sol, ammonia solution and dextrose.

Conspicuous in these above-mentioned sintering processes are:
1. The very long processing times.
2. The changing of the gaseous atmosphere during processing.

It is due to these conditions that the sintering production capacity of this material is small, whilst in addition it is wellnigh impossible technically to sinter in continuous tunnel ovens.

According to the invention it has surprisingly been found that spherical grains of sol-gel material can be sintered by heating and cooling of the material to be sintered, at a speed of 10° – 65°C/minute.

In general the invention permits of application both to a process with continuous ovens and to one with batch ovens.

According to a method of this kind it is possible, for instance, to sinter sol-gel material continuously in about 6 hours, including heating and cooling, in one and the same gaseous atmosphere. It goes without saying that this offers great advantages, as a result of which the field of application of sol-gel material and more particularly A.D.U. material is greatly extended. A.D.U. material can be converted into $UO_2,OO$ with a density > 98 percent T.D.

It may be stated in the fullest sense that sol-gel initial material is composed of hydroxide-like gel material from actinide metals such as uranium, thorium, plutonium, americium, curium or metals with a possibly higher atomic number, to which other elements may possibly have been added. Other elements are in fact added to improve the nuclear qualities. Other elements suitable for this are zirconium, hafnium, yttrium or the metals of the rare earths.

A suitable sintering atmosphere for continuous sintering is a hydrogen-containing gas mixture, usually consisting of 25 percent of $H_2$ and 75 percent of $N_2$, dried over silica gel and activated $Al_2O_3$ respectively and de-oxygenated with the aid of a catalyst.

This gaseous atmosphere, in the case of a continuous method, is maintained throughout the entire process.

In experiments with batch ovens, in which the changing of the gaseous atmosphere presents no great difficulty, dry oxygen-free gas is used only during cooling, whereas during heating and sintering the gas may be moistened.

Instead of $N_2$ one may use some other inert gas, as for instance argon. However, for economic reasons nitrogen is to be preferred.

A suitable temperature for sintering A.D.U. globules in a tunnel oven is about 1,600°C. It has been found that at this temperature the speed of passage is a maximum.

It is also possible to obtain a well-sintered material at lower temperatures ( ≥ 1,200°C).

Especially when a tunnel oven is used, breakage occurs if the globule is of a larger size than 600 $\mu$m (diameter of $UO_2$ globule obtained therefrom). This breakage (about 25 percent) can be avoided by diminishing the speed of passage.

However, the speed of passage had to be diminished to such an extend that the production capacity was only 30 percent of its original yield.

Preheating, for instance in air, calcination of the material to be sintered proved in this case to be a solution to the problem.

The A.D.U. material is in this case heated from a temperature ranging between 0° and 100°C to a final temperature between 300° and 650°C. The preferred temperature in this case is about 450°C.

The heating rate is 200°–300°C/hour.

The preparatory treatment may be carried out either in batches or by means of a tunnel oven.

Calcination may be effected for instance as follows: A quantity of about 4 kg of sol-gel A.D.U. globules is introduced into a cold batch oven. By cold is meant that the oven temperature is 100°C or lower. The oven is afterwards heated to 450°C at a heating-up speed of 200°C/hour.

After calcination the product obtained is sintered at a temperature between 1,200° and 1,700°C, but preferably at 1,600°C, with a heating-up speed which varies during sintering from 10° to 65°C/min, for instance in a continuous tunnel oven.

The rapid heating/sintering of gel containing thorium oxide is known per se. The initial material contains in this case 3.5 per cent by weight of volatile material consisting approximately of equivalent quantities of nitrate and water. After slow heating to about 450°C the hot substances formed are rapidly heated to a temperature of at least 1,150°C.

It is to be noted that the final product consists of 50 percent of irregularly shaped lumps of oxide having a diameter from 1 to 2 mm, whilst the remainder consists of smaller particles formed by the cracking of larger fragments.

It was, however, not obvious that a method whereby 50 percent of the final product had a small diameter due to cracking, would be suitable for the direct sintering of spherical particles of high quality.

The continuous sintering process in its entirety including heating-up and cooling, takes only about 6 hours. An important condition is that this process shall be carried out during the entire cycle in a dry and oxygen-free mixture of a gas containing hydrogen which up to the present had given bad results with this material.

The importance of this invention lies mainly in the fact that it relates to a sintering process which is very attractive both technically and economically.

It is to be noted that it is possible with this process to start with A.D.U. material containing compounds of other elements. It is likewise possible to impregnate with solution A.D.U. globules prior to calcination containing the other elements desired. A similarly method is described in British Patent Specification No. 1,025,276, in the name of Reactor Centrum Nederland (Stichting).

Calcination is usually effected in air, the A.D.U. being converted into $UO_3$. It is also possible to effect calcination in a reducing atmosphere or in vacuo, which methods are absolutely necessary for the preparation of carbides and carbonitrides.

SINTERING

The results of eight sintering tests are set forth in the following Table A. These sintering tests were carried out in an Philips tunnel oven with a length of 2.80 metres.

TABLE A.

| | Initial material with average globule diameter of: | Calcination to 450°C in air | Speed of passage mm/min. | Sintering temp. °C. | Density % T.D. | Breakage % |
|---|---|---|---|---|---|---|
| 1. | 800 μmφ A.D.U. | no | 6.7 | 1650 | >99.0 | 25–30 |
| 2. | 800 μmφ A.D.U. | no | 6.7 | 1350 | >98.- | approx. 25 |
| 3. | 800 μmφ A.D.U. | no | 3.1 | 1300 | >98.5 | 15–20 |
| 4. | 800 μmφ A.D.U. | yes | 6.7 | 1625 | >99.0 | ±1 |
| 5. | 400 μmφ A.D.U. | no | 5.- | 1625 | >99.0 | ±1 |
| 6. | 100 μmφ A.D.U. | no | 6.7 | 1630 | approx. 96.0 | ±1 |
| 7. | 100 μmφ A.D.U. | no | 3.1 | 1630 | approx. 96.5 | ±1 |
| 8. | 100 μmφ A.D.U. | yes | 6.7 | 1630 | >97.5 | ±1 |

Observations:
1. The initial material used was A.D.U. globules, dried at 80°C for 2 hours while exposed to air.
2. By calcination is meant the heating of A.D.U. from 20° to 450° in about 2–3 hours while exposed to air, in batches.
3. Sintering is effected in tunnel ovens in an atmosphere of mixed gas (25 percent of $H_2$ and 75 percent of $N_2$).
4. The density is measured in $H_2O$ with the aid of a pycnometer.
5. The A.D.U. is sintered in $Al_2O_3$ boats (quality Alsint-Haldenwanger).

Review of test results

Test 4 shows that the percentage of breakages can be drastically reduced by calcination.

In spite of the fact that the speed of passage and the sintering temperature was lowered, the percentage of broken globules in test 3 was not drastically reduced.

Test 4 relates to the sintering of globules having an average diameter of 400 microns. According to the results obtained in test 4, globules with this diameter may, if necessary, be sintered without a calcination stage.

The speeds of passage indicated in Table A correspond to rises in temperature of 10° – 30°C/minute.

We claim:

1. A method for the conversion of spherical sol-gel fissile material into spherical oxidic, carbidic or carbonitridic nuclear fuel material, by means of a sintering step, comprising heating the sol-gel spheres to the sintering temperature and cooling from the sintering temperature at respectively heating and cooling rates ranging between 10° and 65°C/minute, the sol-gel material being a composition prepared by solidification through the action of one or more of the factors heat, dehydration, hydrolysis by the action of free ammonia, or of ammonia formed by the decomposition of an ammoniadonor on a globular aqueous metalliferous aqueous phase, selected from the group consisting of metal hydroxide sols, metal salt solutions or mixtures thereof.

2. A method according to claim 1 wherein the sol-gel material consists of spheres of ammonium diuranate.

3. A method as in claim 1 wherein the sintering is carried out in the presence of a reducing gas.

4. A method as in claim 3 wherein the gas is a dry oxygen-free gass and wherein the same gas is present during heating and cooling.

5. A method as in claim 1 wherein sintering is effected at temperatures ranging between 1,200° and 1,700°C.

6. A method as in claim 1 wherein the maximum sintering temperature lies between 1,600° and 1,700°C.

7. A method as in claim 1 wherein the sintering stage is preceded by calcination in an oxygenous atmosphere.

8. A method as in claim 7 wherein calcination is effected at a temperature of from 300° to 650°C.

9. A method as in claim 7 wherein calcination is effected in an oven in which the material is heated at a heating rate not exceeding 200°C/hour from room temperature to a temperature that lies between 300° and 650°C.

10. A method as in claim 1 wherein the sintering stage is preceded by a preheating stage in a reducing gas or in vacuo.

11. Sintered fragments and globules prepared according to the method of claim 1.

12. A method for the conversion of spherical uranium-containing, hydroxide-like gel particles to spherical oxidic particles comprising heating the gel particles to a sintering temperature of between 1,200° C and 1,700° C and cooling the resulting oxidic particles, the heating and cooling being carried out at rates between 10°C/minute and 65°C/minute.

* * * * *

UNITED STATES PATENT OFFICE
CERTIFICATE OF CORRECTION

Patent No. 3,846,520  Dated November 5, 1974

Inventor(s) Engelbertus Jacobus Bruijn; Fokko Wessel Hamburg; Johannes Bastiaan Willem Kanij and Robert de Rooy It is certified that error appears in the above-identified patent and that said Letters Patent are hereby corrected as shown below:

Column 1, line 8

$UD_3 \cdot xNH_3 \cdot (2-x)H_2O$ should read $UO_3 \cdot xNH_3 \cdot (2-x)H_2O$ Column 1, line 25

65-05885 should read 66-05885

Column 2, line 13

$UO2,00$ should read $UO_{2,00}$

Column 5, line 29 gass should read gas

Signed and sealed this 13th day of May 1975.

(SEAL)
Attest:

RUTH C. MASON
Attesting Officer

C. MARSHALL DANN
Commissioner of Patents
and Trademarks